(12) United States Patent
Gorjiara et al.

(10) Patent No.: US 10,033,827 B2
(45) Date of Patent: Jul. 24, 2018

(54) SCALABLE MANAGEMENT OF COMPOSITE DATA COLLECTED WITH VARIED IDENTIFIERS

(71) Applicant: Microsoft Technology Licensing, LLC, Redmond, WA (US)

(72) Inventors: Bita Gorjiara, Sunnyvale, CA (US); Gururaj Seetharama, San Jose, CA (US); Yizhen Zhao, Pacifica, CA (US); Kancheng Cao, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/177,101

(22) Filed: Jun. 8, 2016

(65) Prior Publication Data
US 2017/0359433 A1 Dec. 14, 2017

(51) Int. Cl.
*H04L 29/08* (2006.01)

(52) U.S. Cl.
CPC .......... *H04L 67/2842* (2013.01); *H04L 67/02* (2013.01); *H04L 67/306* (2013.01)

(58) Field of Classification Search
CPC .... H04L 67/02; H04L 67/2842; H04L 67/306
USPC .......................................... 709/213
See application file for complete search history.

(56) References Cited

U.S. PATENT DOCUMENTS

| | | | |
|---|---|---|---|
| 2008/0256462 A1* | 10/2008 | Chao ................. | G06Q 30/02 715/756 |
| 2014/0025769 A1* | 1/2014 | Shrum, Jr. ........ | G06F 17/30902 709/213 |
| 2014/0365563 A1 | 12/2014 | Raghu | |
| 2015/0381756 A1* | 12/2015 | Lotfallah ............ | H04L 67/2814 709/213 |
| 2017/0193031 A1* | 7/2017 | Papapanagiotou | G06F 17/30371 |

* cited by examiner

*Primary Examiner* — Michael C Lai
(74) *Attorney, Agent, or Firm* — Hickman Palermo Becker Bingham LLP

(57) ABSTRACT

Techniques and a system are provided for a profile manager system that stores multiple profiles. These profiles are used by a content selection system to match entities to content for which the entities would be best suitable. The profile manager system allows a content selection system to identify, in response to a request associated with an entity, different pieces of data from different data sources and match the different pieces of data when the difference pieces of data refer to the same entity. The profile manager system may also provide merging of the different pieces of data, when they are matched as referring to the same entity.

20 Claims, 5 Drawing Sheets

US 10,033,827 B2

SCALABLE MANAGEMENT OF COMPOSITE DATA COLLECTED WITH VARIED IDENTIFIERS

TECHNICAL FIELD

The present disclosure relates to data processing using databases and, more specifically, to reducing time, memory, and other computing resources by creating and maintaining identifiers from composite data sources. SUGGESTED GROUP ART UNIT: 2161; SUGGESTED CLASSIFICATION: 707.

BACKGROUND

Computers allow humans access to information in large quantities, with greater ease than before. Even for data sources that were "siloed" or kept separate, computers help to break down walls separating these data sources. These different data sources may be created, maintained, or modified by different companies or organizations, but sometimes different data sources exist even within a single company or organization.

The ease of producing vast amounts of data from various data sources outstrips our ability to make sense of and use the data. Data from each data source is usually stored in different forms, meaning that the information from each source may be encoded using different formats, have different digital identifiers for the same or similar pieces of information, or include other differences. This makes it difficult to understand how information from one data source relates to another piece of information from another data source.

As one example, it is useful to be able to properly select content for a person so that it matches their taste. However, each person's digital life has gotten much more complicated. A person may have information spread across multiple data sources, for example, browsing history stored with one service, purchase history with another, social networking profile including their friends and family, news services they visit, and communications platforms they use to reach out to others. Each of these data sources is an important, but incomplete picture of the person. For example, a social networking site may indicate who a person knows and communicates with, but will generally lack information on what the person's viewing history is. As another example, a news service may indicate news preferences of a user, but will not have information with whom the user shares news articles with.

It is often computationally expensive to merge all these data sources together. For example, the processing power to scour data from each data source and then to reconcile data from the data sources is difficult and time-consuming. To reduce these computationally expensive operations, merging is avoided or done infrequently, resulting in information that is stale and of reduced usefulness.

Therefore, there is a need to reach a balance between computationally expensive operations and having up-to-date information.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
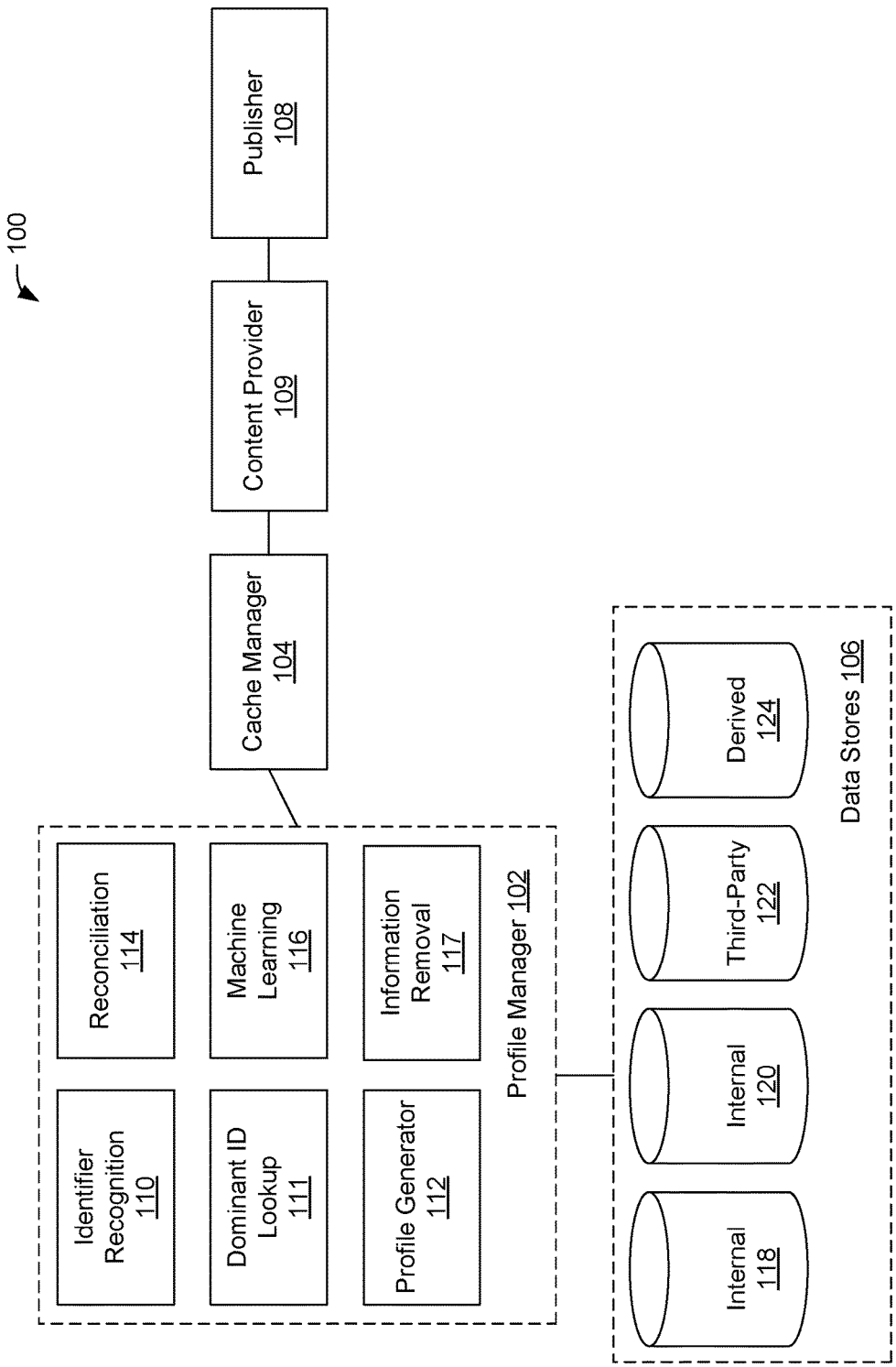
FIG. 1 illustrates a content selection system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A content selection system is described herein which implements techniques for determining, from various pieces of available content, whether to transmit content to a user and selecting what content to transmit to the user. The content selection system may be used with various types of content. As an example, content items may include different types (e.g., application, audio, image, message, model, multipart, text, video, or any combination of these) and for different purposes (e.g., entertainment, advertisement, education, or other purposes).

The content selection system may use other systems, such as a profile manager system or a cache manager system. In various embodiments, the content selection system may include both the profile manager system and the cache manager system, or the profile manager system, depending on the specific needs of the content selection system.

The profile manager system includes features to create profiles of entities. These profiles are used by the content selection system to match entities to content for which the entities would be best suitable. The profile manager system allows the content selection system to identify different pieces of data from different data sources and match the different pieces of data when the pieces of data refer to the same entity. The profile manager system may also provide merging of the different pieces of data, when they are matched as referring to the same entity. The profile manager system does the merging "lazily," meaning that the merging is done on-demand according to a specified event. For example, the profile manager system may execute a merge when a request for content or other specified event occurs.

In an embodiment, a request occurs when a user requests information from a remote computing device. The requests may come from the user's computing device via various means. For example, the user may be using an application, a web browser, a background application, or any other method to request information remotely. In an embodiment, a request comes from a Web browser for a Web page. The Web page includes a portion on the Web page where content is required. For a single Web page, there may be multiple portions requiring content and, for each portion requiring content, a separate request is made. For example, a Web page may include more than one advertisement and for each advertisement, a separate request is made.

When performing a merge, the profile manager system identifies a dominant identifier corresponding to an entity that made a request, such as a user entity that has requested a Web page. The dominant identifier may be any identifier that maps to other identifiers used by the data sources, including an identifier that is already used by a data source. For example, a social networking identifier may be used as both the dominant identifier as well as the identifier for the data source from the social network. In an embodiment, the dominant identifier is selected to be a long-lasting identifier. The long-lasting identifier is an identifier that is unlikely to expire or change. Some examples of long lasting identifiers include account log on information, email addresses, and others. Some examples of non-long lasting identifiers included in the content selection system 100 include IP addresses, mobile device identifiers, and others.

When the dominant identifier is identified, the profile manager system performs a lookup to determine what additional identifiers correspond to the dominant identifier. These additional identifiers correspond to identifiers used by one or more data sources to identify the same entity represented by the dominant identifier. The profile manager system then combines information from the data sources to create a profile for the entity.

In various embodiments, the profile manager system may execute merges when various criteria are met. For example, merging may be done when a retargeting event has been received. As discussed in greater detail elsewhere, a retargeting event may be when the profile manager system receives an opt-out request, a language change request, or many other types of events. Merging may also be done when a certain time period has elapsed. For example, the profile manager system may include a time period, where the time period specifies a length of time before previously created profiles becomes stale. When the time period has elapsed, the profile manager system may execute a merge to generate updated profile information.

The cache manager system includes features allowing the content selection system to determine when to use information stored in a cache memory or when to request a refresh of profile information by executing a merge of information from two or more data sources. Response time is often a limiting factor when responding to a request. Some examples of where there is a low latency requirement includes advertising on real-time bidding advertisement exchanges. On these exchanges, an advertisement request should be completed in less than 100 milliseconds, hence, the expected time budget for the profile manager may be as low as 5 milliseconds. If a response to the request occurs after this time, then the request may no longer be usable.

When profile information is requested for an entity, the cache manager system performs a cache lookup, to determine whether there is profile information for the entity and, if there is profile information, whether the profile information may be used. As an example, even if there exists profile information on an entity, the cache manager system may determine to use or not use the profile information if the profile information is stale (e.g., time when the profile information was generated has exceeded a predetermined amount of time, signifying that the information is likely inaccurate or of low value).

If the profile information is not to be used, then the profile manager determines how to respond to the request. The cache manager system may attempt to generate the profile information in response to the request (e.g., using the profile manager system). However, if the time required to generate the profile information exceeds a certain amount of time, the profile manager returns whatever incomplete data that could be fetched for the given time, and then asynchronously fetches the full/complete profile to be used for subsequent requests.

Sample Use Case: Advertising Content Selection

In an embodiment, the content selection system 100 is used to select advertisements. Advertisement targeting data comes from various data sources. Some of it comes from data sources managed by the same organization executing the content selection system 100. For example, if the organization is a social networking Website, such as LINKEDIN, then there are different data stores available to use to select the best advertisement for users. An example are data stores used for member profiles (including information such as skills, companies, etc.). Some information may come from data stores of partners, some may come from data stores with purchased information, or some information derived information from any of these data stores (e.g., through the use of data analytics). Each of these data stores use an identifier to identify a user. However, the identifiers used for the same user may be different across the data stores. Hence, bits and pieces of targeting data is collected using different identifiers (such as LINKEDIN member identifier, mobile device identifier, browser identifier, email addresses, phone numbers, hashed email address, and other identifiers). To create a complete profile to target content for a user, the information collected from different identifiers should be merged together. Some examples that may trigger a merge are:

(1) Data associated with one of identifiers is updated.
(2) Relationship between identifiers change. New identifiers may be discovered for a user (they login via a new device for instance), or existing IDs may expire or be deleted.

Given the large number of users and potential requests for content from users there are two approaches that may be used:

(1) Offline data merge, where mapping identifiers and merging is limited to certain times. Offline data merge is slow to run. Hence, the profiles generated during the offline data merge can be generated a few times a day, which would not be fresh enough for retargeting scenarios. Another limitation of offline merge is handling of multi-version derived data, in which merged data should be created for all permutations of all versions. As a result, storage of the merged data would not be scalable. In the derived data scenario, this may mean that a first algorithm used to generate derived data from machine learning techniques generates a first version of information and a second algorithm generates a second version of information, even though the first and second algorithms are based off the same data sets. Alternatively, a single algorithm may generate different versions of derived data, by changing assumptions used to generate the derived data. For example, suppose the algorithm calculates values to determine whether various thresholds are met using a mix of information from one or more data sources as well as constant values. By adjusting the constant values, additional versions of derived data may be produced, even though the same algorithm and data sources are used.

Different versions of data may result in a rapid increase in data storage needed to generate, compare, and use the data. For instance, assume there are seven total data stores, five data stores that provide data in a single version, one data store that has two versions of its data, and another data store that has three versions of its data. The total number of possible profiles generated using all of the data stores would then be six (2 times 3). To properly test an algorithm using AB testing, all these profiles would need to be created and stored. This means that it is possible to quickly run out of memory in one or more computing devices used to store the information, just by generating the profiles. As a result, more computing devices would be needed to store the merged data, which would increase the cost of finding and matching content items, and the system could not scale as the number of data sources and versions of information created from the data sources increase.

(2) Stream processing, where a stream of events is received by a near real-time system and, in response, the merged targeting data is generated. These events do not necessarily correspond to requests made by users and may be any piece of information newly received by the system. The downside of this approach is the rate of events is high and triggers many merges that may not even be used. This would be waste of processing power and increase the cost of serving such data. Additionally, similar to offline-merge approach, this approach also has limitations in handling the multi-version stores, and may require producing merged data for all combinations of data versions.

To serve relevant content to users, many data sources with different user information are collected, inferred, or even purchased. For instance, LINKEDIN's advertising serving system may use profile data, various segment info (internal or advertiser-defined), fuzzy searches (including such things as synonyms, singular/plural forms, possible misspellings, stemmings, related searches, and other relevant variations), and derived data to show relevant content. In general, different advertising targeting data may be keyed by different user identifiers (e.g., login identifier, mobile ID, browser ID, email addresses, phone numbers, or partner IDs), and the relationship between IDs may evolve (e.g., ownership of a phone number may change, users may opt-out of a partners' network, a user changes her mobile device, etc.).

The profile manager component 102 learns what identifiers are used for a user across the different data stores. The raw data in these data stores are keyed by their original identifier in each respective data store and a merge is executed lazily based on users' content item requests. When an ad request comes, the profile manager component 102 looks up identifiers related to a user associated with the ad request and fetches targeting data associated with the user from different stores. Merged targeting data may be cached for subsequent access.

In an embodiment, the cache does not include targeting information for all of the users represented in the data stores. The content selection system 100 limits the size of the cache, but keeping only a certain number of targeting information or keeping only targeting information for a certain period of time before it is removed. This allows the content selection system 100 to reduce the necessary size of the cache.

Example Content Selection System

FIG. 1 illustrates a content selection system 100 in which the techniques described may be practiced according to certain embodiments. The content selection system 100 is a computer-based system. The various components of the content selection system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. The content selection system 100 illustrates only one of many possible arrangements of components configured to perform the functionality described herein. Other arrangements may include fewer or different components, and the division of work between the components may vary depending on the arrangement.

The content selection system 100 includes various components used to select content. For ease of understanding, these components are broken into different groups: a profile manager component 102, a cache manager component 104, a data stores component 106, a publisher component 108, and a content provider component 109. Each component group may have one or more additional components as part of the group. However, alternate embodiments of the content selection system 100 may include more or fewer components in each component group, as well as component groupings different than the one shown in FIG. 1.

Although the content selection system 100 shows both the profile manager component 102 and the cache manager component 104, various embodiments of the content selection system 100 may include only the profile manager component 102.

The profile manager component 102 is responsible for creating, updating, and managing profiles for entities stored in the system. In an embodiment, the profile manager component 102 is used with data on persons, such as Internet users. However, various embodiments may include other types of entities such as groups, organizations, or other types. An identification recognition component 110 is responsible for determining, based on a particular piece of data from the data stores component 106, to which user the particular piece of data refers.

A dominant identifier lookup component 111 is responsible for determining, based on the user identified by the identification recognition component 110, a corresponding dominant identifier for the user. For example, the identification recognition component 110 has determined that a first piece of data corresponds to a first user because of a first identifier in the first piece of data. The dominant identifier lookup component 111 performs a lookup using the first identifier to determine what the corresponding dominant identifier is for the first identifier. The dominant identifier may be the same or different than the first identifier.

In an embodiment where profiles of the profile manager component 102 are Internet users, the identification recognition component 110 receives a first piece of information on the Internet user. For example, this may be Web browsing information of the Internet user on a social networking Website and the identification recognition component 110 determines a user account name is included with the Web browsing information. Using the user account name, the dominant identifier lookup component 111 translates this information to a dominant identifier used by the profile manager component 102.

A profile generator component 112 is responsible for merging pieces of information in the data stores component 106 to create a profile. For example, after the dominant identifier lookup component 111 has determined a dominant identifier for a piece of information, the profile generator component 112 may retrieve an existing profile associated with the dominant identifier. The existing profile may need to be updated with pieces of information, from one or more data stores. A reconciliation component 114 is responsible for working with the profile generator component 112 to determine how a piece of information is incorporated with an existing profile if there is a conflict between pieces of information from data stores and the existing profile. The reconciliation component 114 may replace, update, or supplement already existing information from the piece of information with the existing profile. For example, if an existing profile already indicates a user is interested in cars and the piece of information indicates the user is interested in travel, then the reconciliation component 114 may determine the updated profile may include both cars and travel as interests or replace cars with travel.

A machine learning component 116 is responsible for improving results determined by the content selection system 100. The content selection system 100 may employ various types of testing methods to determine the accuracy of the profiles created by the profile manager component 102. For example, the profile manager assumes that, if the profiles are highly accurate for users, then the likelihood of users approving, viewing, or interacting with content selected based on the profiles will increase. Different testing techniques may be used to determine and compare the increased likelihood. Some of these testing techniques include AB testing, click-through testing, successful conversion testing, and many other types of testing. The machine learning component 116 may work in conjunction with the content provider component 109.

An information removal component 117 is responsible for removing profiles or information from profiles, based on specific events. As discussed in greater detail elsewhere, there may be a variety of reasons why, for a profile that has already been generated and stored (e.g., in cache storage) may need to be updated.

The cache manager component 104 is responsible for retrieving profiles when a request received. As discussed in greater detail elsewhere, the content selection system 100 provides more than one method to supply a profile, depending on various factors.

The data stores component 106 includes various data sources accessible by the profile manager component 102 to generate profiles. A data source may be stored in one or more data storage objects, such as a database. In an embodiment, one or more data sources are stored in a single table data structure instance. For example, information from a first data source may be stored as a first row of data and information from a second data source may be stored as a second row of data. This allows the system to consolidate information from more than one data source, so that fewer requests to different data storage objects are required.

Each data source is associated with a reliability or query time indicator. For example, different data sources may have different response times. Some data sources may have a very low response time (e.g., load on the data source is low, data source is hosted on fast computing equipment, data source is an internal data source, data source prioritizes requests from the profile manager, or other reasons) when compared to others. As discussed in greater detail elsewhere, this assists the cache manager component 104 to determine whether a request may be satisfied.

Some examples of data sources include:

Internal data sources 118 and 120. These include data sources created, maintained, and managed by an organization that is executing the profile manager component 102. Each data source may come from different teams from within the organization, such as a team focusing on user submitted profile information and a team focusing on user submitted connections information.

Third-party data source 122. This includes data sources created, maintained, and managed by an organization different than an organization executing the profile manager component 102. As an example, the third-party data source 122 includes data stores accessible by one organization from another organization through a rental or sharing agreement between the organizations.

Derived data source 124. This includes data sources created, maintained, and managed by an organization that were not provided by users themselves, but determined through analyzing pieces of information from other data stores (e.g., internal data stores, third-party data stores, or other data stores). For example, if a user is associated with pieces of information relating to automobiles, such as online activity indicating visiting Web pages discussing automobiles or visiting Web pages of car dealerships, then the derived data source may indicate an interest for the user in automobiles.

There are numerous ways the content selection system 100 may produce or receive produced information for the derived data store. Derived data is usually generated using multiple machine learning algorithms, and through experimentation, the best algorithm is selected. Such experimentation is called A/B testing. An example of A/B testing includes:

The profile manager component 102 is responsible for handing A/B testing. For instance, suppose have we have a data provider that needs to experiment with two algorithms (algorithms 1 and 2), and has provided its data in a single store. At runtime, depending on A/B testing requirements, the profile manager may read data generated by algorithm 1 for a subset of users, and data generated by algorithm 2 for the rest of users. The results for profiles generated using the derived information may be compared, to determine whether algorithm 1 or algorithm 2 produced more positive outcomes. Some examples of positive outcomes may be increased conversion rate for content items matched using profiles, increased user interaction for content items matched using profiles, increased ease of use for content items matched using profiles, or many other outcome types.

Five examples of different data stores are shown in the data stores component 106, however there may be fewer or more data stores than shown here. For example, there may be more internal data sources than shown in FIG. 1 or no third-party data source 122. Other data stores may also be included, not shown in FIG. 1.

The publisher component 108 is responsible for indicating when there are opportunities for the content selection system 100 to include content. For example, the publisher component 108 notifies the content selection system 100 that a user has viewed a Web page, and that there are one or more opportunities for the content selection system 100 to include content.

The content provider component 109 is responsible for content in the content selection system. The content provider component 109 uses profile information from the profile manager component 102 to match the user with the most relevant content item.

Request Processing

Some specific flows for implementing a technique of an embodiment are presented below, but it should be understood that embodiments are not limited to the specific flows and steps presented. A flow of another embodiment may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular application or based on the data.

Figure 2:
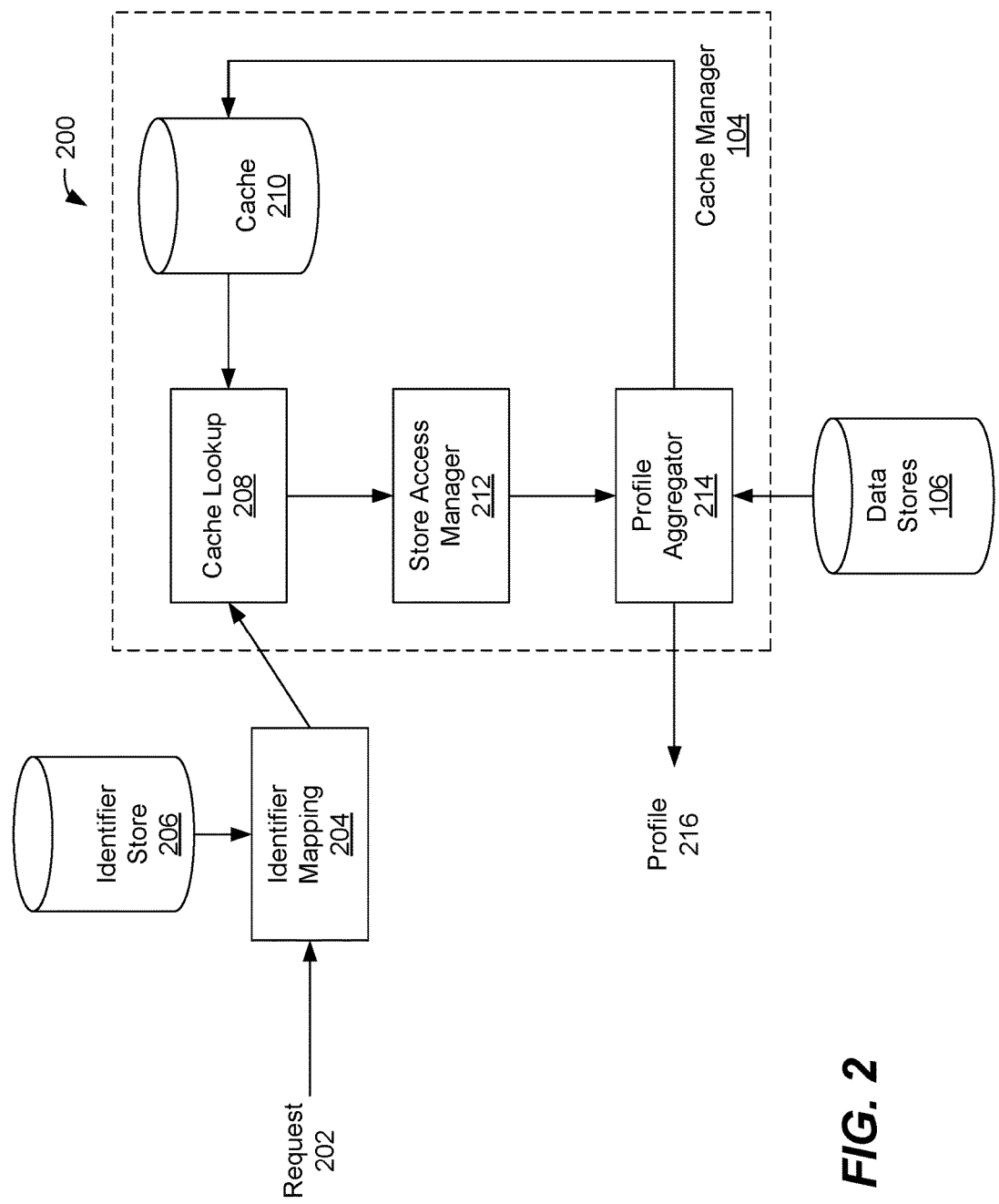
FIG. 2 shows an example flow of how a request is processed by various components of the content selection system.

FIG. 2 shows an example flow 200 of how a request is processed by various components of the content selection system 100, in an embodiment. In a first step, a request 202 is received by the content selection system 100. The request 202 may include various pieces of information, such as identifying information of an entity that made the request, where the entity made the request, and other information. The request may be associated with a single user of the content selection system 100. In a second step, an identifier mapping component 204 determines from an identifier store 206 what identifying information is included with the request, a dominant identifier associated with the identifying information, and other identifiers associated with the dominant identifier. The cache manager component 104 provides further processing of the request. In a third step, the cache manager component 104 performs a cache lookup 208. For example, the cache manager component 104 will determine from a cache 210 if there exists a stored profile for the dominant identifier, as well as when the stored profile was generated. In a fourth step, a store access manager 212 will determine which profile, if any, is returned in response to the request. For example, the store access manager 212 may determine what data is to be included with a request. The store access manager 212 may optionally determine a context and expected response time to satisfy the request. Various embodiments of the cache manager component 104 may include all or a subset of these options to reply to the request:

Cache hit. If the store access manager 212 determines that there exists a stored profile and that the stored profile for the dominant identifier is not stale, then the store access manager 212 may return the stored profile.

Cache miss—hard cache miss. If the store access manager 212 determines that there is no stored profile for the dominant identifier, then the store access manager 212 may choose to generate a new profile. For example, the store access manager 212 is aware that first and second data sources would be required to generate the new profile. Based on an expected response time for the first and second data sources (e.g., historical analysis of response times), the store access manager 212 determines that, although the stored profile is unusable, it would be possible to generate the new profile and timely respond to the request. For example, the store access manager 212 determines a timeout for fetching data from a data store. If one or more data stores timeout and cannot produce their profile information before the timeout, then the store access manager 212 will mark any profile created for the dominant identifier as incomplete. The incomplete profile may still be transmitted for use. Additionally, the store access manager 212 may asynchronously fetch information from the timed out data sources to generate a complete profile. This complete profile is stored for use during subsequent requests.

Cache miss—soft cache miss. If the store access manager 212 determines that the stored profile for the dominant identifier is stale, then the store access manager 212 may choose to provide the stored profile. The store access manager 212 determines that it would still be valuable to provide the stored profile in response to the request, even when the profile is stale. After responding to the request, the store access manager 212 instructs the new profile to be generated, asynchronous to responding to the request to be used for any subsequent requests.

No response. If the store access manager 212 determines that the stored profile for the dominant identifier is stale and that it would not be valuable to provide the stored profile, then the store access manager 212 may choose to forgo responding to the request. This may mean that the request will be ignored or that the content selection system 100 will select content without associated profile information. After choosing to forgo responding to the request, the store access manager 212 may instruct a new profile to be generated, asynchronous to responding to the request.

In a fourth step, a profile aggregator 214 provides a profile 216 according to the path determined by the store access manager 212. The profile aggregator 214 may access the data stores component 106, as described in greater detail elsewhere. This profile 216 is stored in the cache 210, for potential future use. In a fifth step, the profile is provided in response to the request.

Removing Information from Profiles

In an embodiment, the content selection system 100 includes features to remove information from existing profiles. Removal of information is generally specific to the data source. Some examples of data sources include:

Expiring data source. A data store may be collecting a type of information that expires. As an example, a Web browsing data store includes Web browsing history of a user. Web browsing information from the data store may only be kept and used for a certain period of time. Thus, if profiles include information from the Web browsing data store, then, when the certain period of time has passed, the profile must be updated to remove information in the profile generated based on the Web browsing data store. An example is information collected by a web browser. User information collected by the web browser is tied to a web browser identifier. In many areas of the world, information collected and indexed by a browser identifier is usable only for a certain length of time, as defined by laws in each country, state, or locality.

Opt-out. A data store may be collecting a type of information that a user provides about themselves (e.g., through their browsing history, entry of information online, language selection, or other). However, after the user has provided the information, the user may choose to un-share or opt-out from allowing the content selection system 100 to use the information. For example, if a user has shared their location information and it is stored in a location data source, they may later decide to no longer share their location information. Thus, if the user's profile includes their location information, then the system removes this location information. In another example, a user may select a language for content they would like to receive. However, subsequent to their selection, they decide they would no longer like to receive content in their selected language. Thus, if the user's profile includes language information, then the content selection system 100 removes this language information.

The content selection system 100 may include a listener, which monitors specific data stores. The monitored data stores may be those indicated as including information that may be subject to a request for removal. When a removal request is received, the content selection system 100 receives an event that contains the user identifier, and generates an updated profile for the user to replace the previously stored profile.

Example Flow for Generating Profiles

Figure 3:
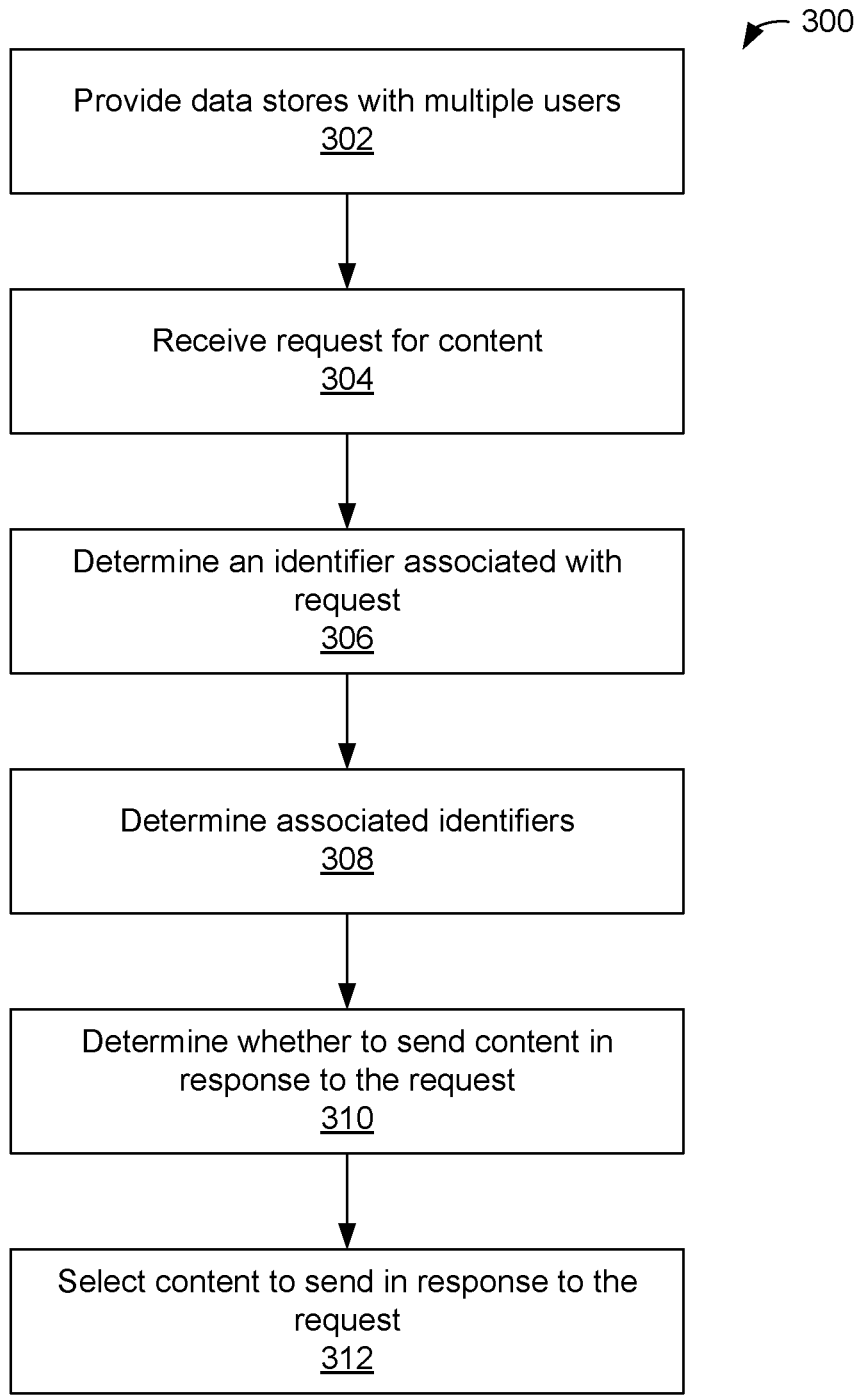
FIG. 3 is a flowchart that depicts an example process for generating profiles.

FIG. 3 is a flowchart that depicts an example process 300 for generating profiles, in an embodiment. In a step 302, the content selection system 100 provides content selection system 100 data stores with information on multiple users. For example, each data store includes information on multiple users. There is user data on at least one user in each of the data stores. In a step 304, the content selection system 100 receives a request for content. For example, the user with information stored in the data stores makes a request for content. In a step 306, the content selection system 100 determines an identifier associated with request. This may be a dominant identifier, used by the content selection system 100 to index a corresponding profile for the user.

In a step 308, the content selection system 100 determines associated identifiers with the identifier. For example, a look up is performed using the determined identifier in step 306, to determine what other identifiers there are for the determined identifier. These other identifiers are identifiers used by one or more data sources to hold information related to the determined identifier.

In a step 310, the content selection system 100 determines whether to send content in response to the request. For example, if the content selection system 100 determines that the profile is of low value (e.g., stale or of otherwise low value), then the content selection system 100 may determine to not send content in response to the request. In a step 312, the content selection system 100 selects content to send in response to the request. The content may be any of the types of content as discussed in this application.

Example Flow for Cache Management

Figure 4:
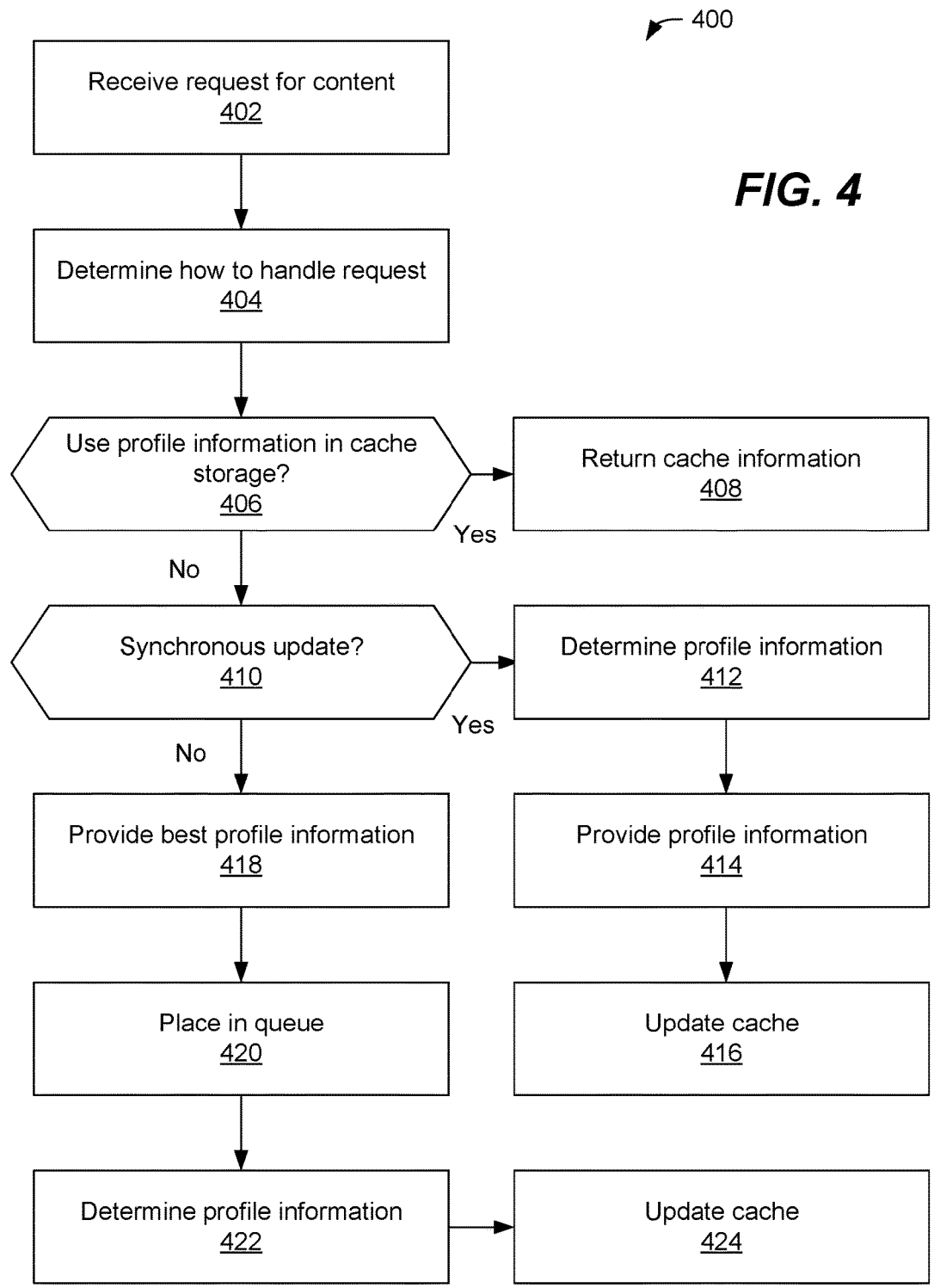
FIG. 4 is a flowchart that depicts an example process for determining whether to use profiles stored in a cache.

FIG. 4 is a flowchart that depicts an example process 400 for determining whether to use profiles stored in a cache, in an embodiment. In a step 402, the content selection system 100 receives a request for content. In a step 404, the content selection system 100 determines how to handle the request. For example, the content selection system 100 may use the cache manager component 104 to determine which options to use in replying to the request, as discussed in greater detail elsewhere.

In a step 406, the content selection system 100 determines whether to use profile information in the cache storage. Profile information may be any type of information useful for the content selection system 100 to determine the best fit of content for a specific request. In an embodiment, profile information includes a profile for a user that makes a request for content. The profile is used to determine tastes, interests, propensity, or other information on the user that indicates what kind of content that would be best suited for the user. In a step 408, the content selection system 100 determines to use information in the cache storage and returns the cache information in response to the request.

In a step 410, the content selection system 100 determines to not use information in the cache storage and determines whether to make a synchronous update. For example, a synchronous update occurs when a profile for a user is updated and the updated profile is provided in response to the request.

In a step 412, the content selection system 100 determines to provide a synchronous update and determines profile information. In a step 414, the content selection system 100 provides profile information. In a step 416, the content selection system 100 updates the cache with the determined profile information.

In a step 418, the content selection system 100 determines to not provide a synchronous update and provides the best available profile information. This may include profile information already stored in the cache, even if the profile information is potentially stale. In a step 420, the content selection system places in a queue an instruction to update the profile information. The queue may include one or more instructions for updates to profile information. Instructions in the queue may be processed as a batch or when computing resources are available to do so. In a step 422, after content is selected by the content selection system 100, the content selection system determines profile information when the queue is processed. In a step 424, the content selection system 100 updates the cache with the determined profile information.

Example Embodiment of Managing Composite Identifiers

In an embodiment, the content selection system 100 includes data stores. Each data store includes information about one or more users. The data stores may include different types of data (e.g., Web browsing information, connections in a social network platform, and many others). The content selection system 100 receives a request for content to present on a computing device. The request may come indirectly from a user through a publisher. The request includes an identifier for the user. Identifiers may be any piece of information used to identify different users. In various embodiments, the identifier is at least one of a social network member identifier, a browser identifier, a device identifier, or a third-party identifier established by a third-party that is different than the party that receives the request.

In response to receiving the request, the content selection system 100 retrieves first user data from a first data store and second user data from a second data store. For example, a single identifier comes with the request. The content selection system 100 maps, based on the single identifier, other identifiers that one or more data stores may use to reference a user with the single identifier. This may result in one or more identifiers for the request, such as identifiers for each data source. The first and second user data are combined to generate composite user data or combined user data. Using the combined user data, the content selection system 100 determines whether to send content (and/or which content to send) to the computing device. The content selection system 100 may also indicate to the publisher that the content selection system 100 will transmit content and select the content to be transmitted.

The content selection system 100 may also, for a second request for content to present on a second computing device, made after the first request, retrieve the combined user data from cache storage. In various embodiments, the computing device and the second computing device may be the same computing device. If the user is surfing the Internet on their computing device, they may make many requests for content to the content selection system 100. For example, the user may be engaged in a browsing session, where the user navigates from one page to the next in a single viewing session. Alternatively, if the user is viewing a single Web page with a large amount of content, then the content selection system 100 may receive multiple requests for content for the single Web page.

In another embodiment, the computing device and the second computing device are different devices. When they are different devices, the content selection system 100 identifies, based on the requests, that the same user made the first and second requests. Although the combined user data was created in response to the first request, the content selection system 100 may use the combined data for the second request.

The content selection system 100 may include features to delete data stored in the data stores. As described previously, this may be in response to expiring data, opt-out requests, or other reasons. The content selection system 100 identifies the particular data store where the data to be deleted is stored and then removes the data.

In an embodiment, the content selection system 100 determines that there exists prior combined user data before receiving the request. However, because the prior combined user data has expired, contains opt-out information, or for other reasons, the content selection system 100 determines to not use the prior user data and determines to generate new combined user data.

Example Embodiment of Cache Management with Composite Identifiers

In an embodiment, the cache manager component 104 includes receiving a request for content to present on a computing device, where the request includes an identifier. In response to receiving the request, the cache manager component 104 determines whether user data associated with the identifier is in cache storage. In response to the cache manager component 104 determining that no user data that is associated with the identifier is stored in the cache storage, the cache manager component 104 retrieves first user data from a first data store. However, the cache manager component 104 determines to not wait to retrieve, from a second data store, second user data that is associated with the identifier and that is stored in the second data store. This may be due to the second data store having long response times, or any of the other reasons as discussed elsewhere in this application. Based on the first user data, the cache manager component 104 determines whether to send content to the computing device. This may be an incomplete user profile because it lacks information (e.g., from a second data store) accessible to the cache manager component 104 but not used.

In various embodiments, the request is a first request and after determining to not wait to retrieve the second user data, the cache manager component 104 retrieves the second user data from the second data store. The cache manager component 104 combines the second user data with the first user data to generate combined user data and stores the combined user data in the cache storage. After storing the combined user data in cache storage and after determining whether to send content to the computing device, the cache manager component 104 receives a second request for content to present on a second computing device. In response to receiving the second request, the cache manager component 104 retrieves the combined user data from the cache storage and determines, based on the combined user data, whether to send content to the second computing device.

In another embodiment, where the request is a first request, the cache manager component 104 receives a second request for content to present on a second computing device, where the second request includes a second identifier and, in response to receiving the second request, determines whether user data that is associated with the second identifier is stored in the cache storage. For example, a dominant identifier is determined for the second request and the cache is searched based on the dominant identifier. In response to determining that particular user data that is associated with the second identifier is stored in the cache storage, the cache manager component 104 determines whether the particular user data in the cache storage is classified as stale. Information may be classified as stale if the time from when it was created from the request exceeds a predetermined amount of time. If the particular user data is stale, then the cache manager component 104 determines, based on the particular user data, whether to send content to the second computing device. The cache manager component 104 retrieves, based on the second identifier, first particular user data from the first data store and second particular user data from the second data store. This may occur after the cache manager component 104 has determined whether to transmit content. The second particular user data is used to generate combined particular user data with the first particular user data.

In an embodiment, determining not to wait for the second data store includes determining that a threshold period of time has elapsed since the data request to the second data store and that no response to the data request has yet been received from the second data store.

In an embodiment, the cache manager component 104 accesses a profile data source and a derived data source. Other embodiments may include multiple data sources for profile data and derived data. The profile data source includes information provided by users about themselves. The derived data source includes information generated based on the information that users provide about themselves and/or information about online user behavior, such as which web pages have been visited, which content has been selected, and which files have been downloaded. For example, derived data may indicate an interest a user has in a certain category.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
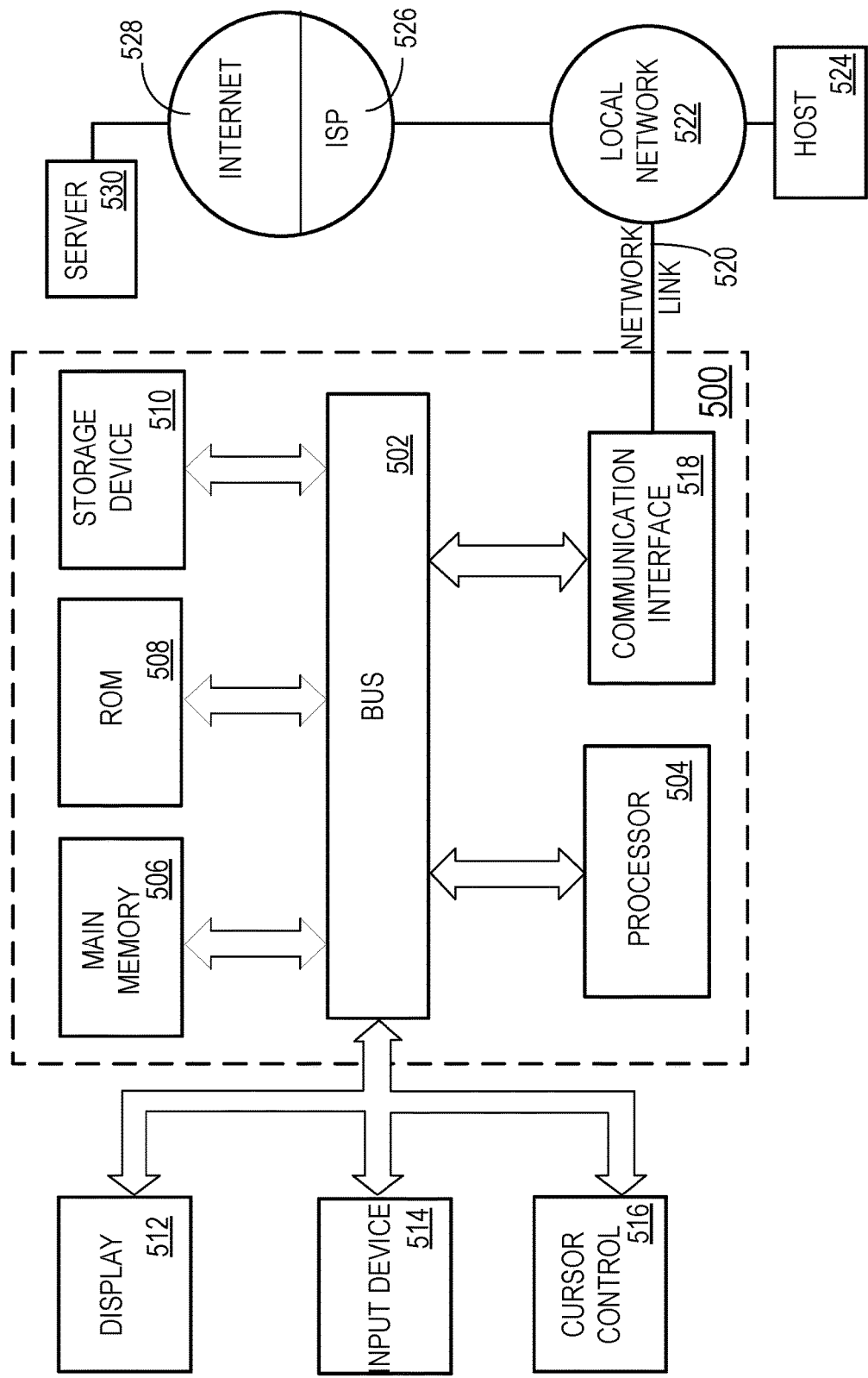
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 650 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
providing a plurality of data stores, each data store storing data about multiple users;
receiving a first request for first content to present on a computing device, wherein the first request includes an identifier; and
in response to receiving the first request:
retrieving, based on the identifier, first user data from a first data store of the plurality of data stores;
requesting, based on the identifier, from a second data store of the plurality of data stores, second user data;
determining response time data that is associated with the second data store of the plurality of data stores;
based on the response time data, determine not to wait for user data from the second data store;
determining, based on the first user data, second content to send to the computing device; and
transmitting the first content and the second content to the computing device;
retrieving, based on the identifier, the second user data from the second data store of the plurality of data stores;
combining the first user data with the second user data to generate combined user data;
in response to receiving a second request for third content to present on a second computing device, wherein the second request includes the identifier:
determining, based on the combined user data, fourth content to send to the second computing device; and
transmitting the third content and the fourth content to the second computing device.

2. The method of claim 1, further comprising:
storing the combined user data in cache storage prior to receiving the second request;
in response to receiving the second request, retrieving the combined user data from the cache storage.

3. The method of claim 2, wherein the first request is in response to a request for a first Web page by the computing device.

4. The method of claim 3, wherein the second request is in response to a request, by the computing device, for a second Web page that is different than the first Web page.

5. The method of claim 1, wherein the identifier is a first identifier and the step of retrieving the first user data from the first data store and the second user data from the second data store comprises:
determining that the first identifier is associated with a second identifier;
retrieving, based on the first identifier, the first user data from the first data store of the plurality of data stores; and
retrieving, based on the second identifier, the second user data from the second data store of the plurality of data stores;
wherein the combined user data comprises at least a portion of the first user data and the second user data.

6. The method of claim 1, wherein the identifier is at least one of a social network member identifier, a browser identifier, a device identifier, or a third-party identifier established by a third-party that is different than a party that receives the first request.

7. The method of claim 1, further comprising:
determining to delete user data pertaining to a particular identifier;
identifying a particular data store of the plurality of data stores; and
removing, from the particular data store, particular user data that is associated with the particular identifier.

8. The method of claim 1, wherein the first data store stores a first type of data that is not found in the second data store and the second data store stores a second type of data that is not found in the first data store.

9. The method of claim 8, wherein:
the first type of data includes profile data, and the profile data is provided by each respective user; and
the second type of data includes non-profile data that is derived based on behavior data that indicates online activities in which a subset of the multiple users participate.

10. The method of claim 1, wherein:
a third data store, in the plurality of data stores, stores user data from a third party that is different than a party that receives the first request.

11. The method of claim 1, further comprising:
identifying there exists prior combined user data that was generated before receiving the first request;
determining to ignore the prior combined user data; and
after identifying there exists the prior combined user data, determining to combine the first user data with the second user data to generate the combined user data.

12. The method of claim 11, wherein the prior combined user data was expired when the first request was received.

13. The method of claim 1, further comprising:
determining that prior combined user data, that was generated before the first request was received, is unusable; and
after determining that the prior combined user data is unusable, determining to combine the first user data with the second user data to generate the combined user data.

14. The method of claim 1, further comprising before retrieving first user data and before combining the first user data with the second user data, matching a user identifier specific to the first data store with a second user identifier specific to the second data store as being user data for the same user.

15. The method of claim 1, wherein the first content comprises user-selected content identified by the first request and the second content comprises system-determined content.

16. A system comprising:
a plurality of data stores, each data store storing data about multiple users;
one or more processors;
one or more storage media storing instructions which, when executed by the one or more processors, cause:
receiving a first request for first content to present on a computing device, wherein the first request includes an identifier; and
in response to receiving the first request:
retrieving, based on the identifier, first user data from a first data store of the plurality of data stores;
requesting, based on the identifier, from a second data store of the plurality of data stores, second user data;

determining response time data that is associated with the second data store;

based on the response time data, determine not to wait for user data from the second data store, determining, based on the first user data, second content to send to the computing device; and transmitting the first content and the second content to the computing device;

retrieving, based on the identifier, the second user data from the second data store of the plurality of data stores;

combining the first user data with the second user data to generate combined user data;

in response to receiving a second request for third content to present on a second computing device, wherein the second request includes the identifier:

determining, based on the combined user data, fourth content to send to the second computing device; and transmitting the third content and the fourth content to the second computing device.

17. The system of claim 16, wherein the instructions, when executed by the one or more processors, further cause:

storing the combined user data in cache storage prior to receiving the second request;

in response to receiving the second request, retrieving the combined user data from the cache storage.

18. The system of claim 17, wherein the first request is for a first Web page by the computing device.

19. One or more storage media storing instructions which, when executed by one or more processors, cause:

providing a plurality of data stores, each data store storing data about multiple users;

receiving a first request for first content to present on a computing device, wherein the first request includes an identifier; and in response to receiving the first request:

retrieving, based on the identifier, first user data from a first data store of the plurality of data stores;

requesting, based on the identifier, from a second data store of the plurality of data stores, second user data;

determining response time data that is associated with the second data store of the plurality of data stores;

based on the response time data, determine not to wait for user data from the second data store, determining, based on the first user data, second content to send to the computing device; and transmitting the first content and the second content to the computing device;

retrieving, based on the identifier, second user data from the second data store of the plurality of data stores;

combining the first user data with the second user data to generate combined user data;

in response to receiving a second request for third content to present on a second computing device, wherein the second request includes the identifier:

determining, based on the combined user data, fourth content to send to the second computing device; and transmitting the third content and the fourth content to the second computing device.

20. The one or more storage media storing instructions of claim 19, wherein the identifier is a first identifier and the instructions which, when executed by one or more processors, further cause:

prior to combining the first user data with the second user data:

determining that the first identifier is associated with a second identifier; and retrieving, based on the second identifier, particular user data from a particular data store of the plurality of data stores;

wherein the combined user data comprises at least a portion of the particular user data.

* * * * *